United States Patent [19]
Vezard

[11] Patent Number: 5,581,356
[45] Date of Patent: Dec. 3, 1996

[54] HIGH PURITY TUNABLE FORENSIC LIGHT SOURCE

[75] Inventor: Nicolas Vezard, Metuchen, N.J.

[73] Assignee: Instruments SA, Inc., Edison, N.J.

[21] Appl. No.: 520,771

[22] Filed: Aug. 30, 1995

Related U.S. Application Data

[63] Continuation of Ser. No. 227,962, Apr. 15, 1994, abandoned, which is a continuation-in-part of Ser. No. 76,916, Jun. 14, 1993, abandoned.

[51] Int. Cl.$^6$ .................................................. G01N 21/64
[52] U.S. Cl. ...................... 356/418; 356/417; 250/458.1; 250/461.1; 250/504 R
[58] Field of Search .................................... 356/417, 418, 356/416; 250/458.1, 461.1, 493.1, 504 R, 504 H, 373; 362/32

[56] References Cited

U.S. PATENT DOCUMENTS

| | | | |
|---|---|---|---|
| 3,792,230 | 2/1974 | Ray | 250/504 |
| 4,149,086 | 4/1979 | Nath | 250/504 R |
| 4,176,916 | 12/1979 | Carpenter | 356/418 |
| 4,236,075 | 11/1980 | Nexo et al. | 356/418 |
| 4,298,806 | 11/1981 | Herold | 250/504 H |
| 4,385,344 | 5/1983 | Gonser | 250/504 R |

Primary Examiner—F. L. Evans
Attorney, Agent, or Firm—Handal & Morofsky

[57] ABSTRACT

A device for illuminating forensic depositions or other evidence that simultaneously provides output in three bands, the visible, ultraviolet and infrared. By a sequential mounting and rotation in two independent axis of a large selection of wavelength and bandwidth filters, the invention provides a highly-focused illumination system easily adjustable by the operator to enable selection of particular frequencies and bandwidths for enhanced observation of forensic subjects.

23 Claims, 4 Drawing Sheets

Strongly Fluorescent Surface Behind Print

Strongly Fluorescent Surface Behind Print

Strongly Fluorescent Behind Print

Strongly Fluorescent Behind Print

HIGH PURITY TUNABLE FORENSIC LIGHT SOURCE

This application is a continuation of application Ser. No. 08/227,962, filed 15 Apr. 1994, now abandoned, which was a continuation-in-part of 08/076,916 filed Jun. 14, 1993, now abandoned.

TECHNICAL FIELD

The present invention relates to light sources for illuminating forensic depositions or other evidence with light of selectable wavelength ranges and wavelengths.

BACKGROUND

Starting at the end of the nineteenth century, crime fighters began to use and develop what has grown into a substantial body of technological tools designed to detect and/or enhance physical evidence. One of the earliest techniques of this kind to receive widespread application is the dusting of fingerprints. Light sources were also among the first tools used in this field. Hence the classic icon of the gumshoe, flashlight in hand, searching for evidence at the dimly lit crime scene.

When a fingerprint is fresh, the oil which forms the print generally follows the pattern of the fingerprint ridges in the finger which made the print. If a fine dust is applied to the surface of a fresh print, the dust tends to adhere to the oils in the fingerprint, thus forming a pattern which generally reveals the pattern of the fingerprint.

Fingerprint dusts were initially selected for their color contrasting qualities as compared to the background. Thus white dust was used to enhance a fingerprint on a black object and vice versa. Even where the oils of a fingerprint have lost their tackiness due to aging or other phenomena, the amino acids into which they break down do cause a minute etching of many surfaces. While this etching is often not visible to the naked eye, and may not become visible with the application of a colored powder, extremely fine fluorescent dusting powders will reveal the fingerprint pattern when illuminated under high intensity light. Today, many materials, such as dyes, in addition to fluorescent dusting powders are used. Inspection of the evidence is done with specialized light sources. These light sources usually comprise a high intensity source and a filter which passes light having a limited range of wavelengths. Depending upon the material used, which material may be either a fluorescent dusting powder, dye, or other marker material, light having a wavelength which substantially coincides with a known excitation wavelength of the marker is employed. The characteristic of the marker is that, upon illumination with light at one of its excitation wavelengths, it will fluoresce, or emit light. Such fluorescence is typically at a longer wavelength as compared to the excitation wavelength.

Examination of evidence is also enhanced through the use of color filtering glasses or barrier filters, whose color filtering characteristics are tuned to maximize the image to be detected. As noted above, the excitation wavelength is varied through the use of filters at the source. While such devices are very efficient in filtering light, every filter has its own fixed characteristics. These include its center wavelength, bandwidth and transmission coefficient. Thus, if one wishes to have flexibility, it is necessary to have a wide range of filters having different center wavelengths and different bandwidths. This is both cumbersome and expensive. Moreover, as new dyes and powders are introduced, old filters can become obsolete or unnecessary.

In an attempt to provide convenience and flexibility, some light sources used for forensic examination come with a mechanical filter assembly, which allows the introduction of one of about a half dozen filters into the path of the light source to provide the desired wavelength illumination. While this does solve the problem of providing a convenient and easy way to use a light source, obsolescence and limited wavelength and bandwidth selection remain.

In an attempt to overcome some of these disadvantages, earlier forensic illumination systems have attempted to achieve a measure of tunability by mounting an interference filter for angular rotation. Generally, such angular rotation results in a change in angle of incidence with respect to the filter input and a relatively small variation in the encountered path length between the functional layers in the interference filter for light passing through the filter in a fixed direction. In accordance with Bragg's Law, this results in different wavelengths being passed by the filter.

In U.S. patent application Ser. No. 07/904,993 of Purcell, filed Jun. 26, 1992, and entitled: "METHOD AND APPARATUS FOR FORENSIC EXAMINATION OF SURFACES," a system is disclosed which provided a high intensity light source which is continuously adjustable to vary the center frequency of a band of wavelengths. At the same time, the flexibility of varying the bandwidth of this band was also possible. The same was done with a single light source and a single filtering apparatus. At the same time that was achieved with a mechanical configuration that is both reliable and rugged. Finally, that system was easily portable, and capable of outputting light sufficient for close up analysis of surfaces bearing such material as oils, semen, blood and so forth.

In that system, a method and apparatus for illuminating a deposition of organic material such as, blood, sweat or oil for forensic examination was also provided. A light source emitted light having a range of wavelengths. A first optical coupler or light pipe was positioned and configured to reflect the light toward a reflective diffraction grating. A supportable structure supported, at a selectable relative position, an exit slit and the grating to pass a desired band of wavelengths of output light from portions of the light reflected by the grating. A bendable second optical coupler was coupled to the exit slit and directed the output light toward the deposition to be examined. The bendable second optical coupler comprised a liquid fiber optic member. The support structure rotated the grating. An electronic control and a hand held remote control pad was coupled to the support structure and controlled the support structure.

As can be seen from the above, numerous advantages are provided in such a continuously adjustable diffraction grating based system. Naturally, it is desirable to have the possibility of the highest possible intensity output light at the selected wavelength. However, such a brute force approach results in increased power consumption and excessive heat energy, stressing the rest of the system. In an attempt to achieve better results without aggravating this problem, the above disclosure of Purcell utilizes an IR blocking filter to filter the light source thus allowing only filtered and relatively low intensity light to fall on the grating. This, however, also has an adverse impact on the amount of energy output by the forensic light source, particularly in the UV range. In addition, the use of the filters, because they are exposed to a high intensity source, results in there being another element subject to deterioration and replacement.

SUMMARY OF THE INVENTION

The invention, as claimed, is intended to provide a remedy. It solves the problem of how to provide a tunable forensic light source of high purity and intensity.

According to the invention there is provided a forensic light source of the type which includes a light source and output means for outputing light from a housing. The light source outputs light along a path from the source to the output means. The improvement comprises an ultraviolet reflecting mirror, for providing an ultraviolet light output. The mirror is movably mounted on a movable support and is selectively positioned at a first position in the path of the light output from the housing or at a second position external to the path. A rotatable wheel has a plurality of bandpass filters mounted it. The rotatable wheel is positioned in the path and spaced from the mirror.

BRIEF DESCRIPTION OF THE DRAWINGS

One way of carrying out the invention is described in detail below with reference to drawings which illustrate only one specific embodiment of the invention and in which.

BEST MODE FOR CARRYING OUT THE INVENTION

Figure 1:
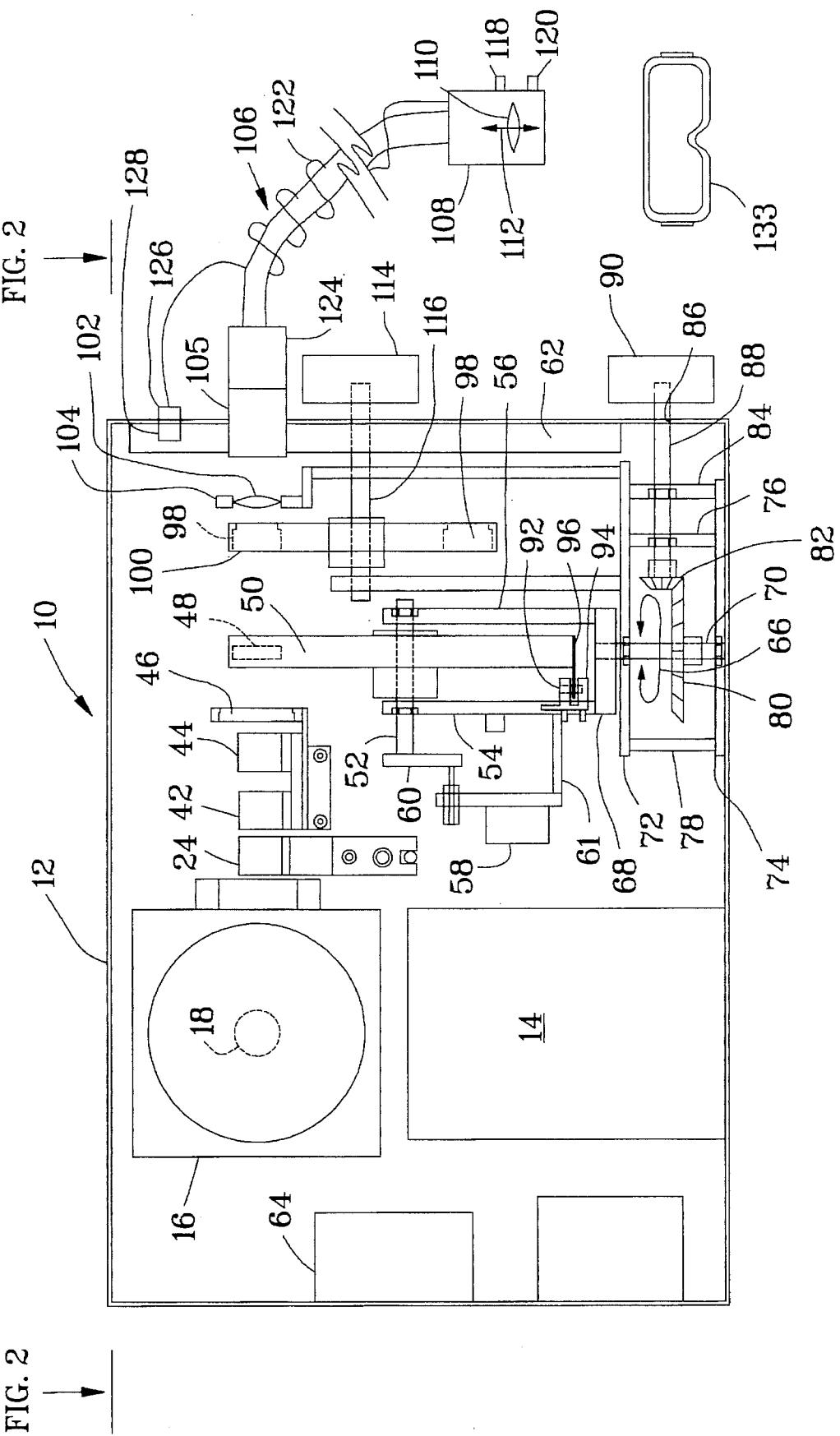
FIG. 1 is a side view of the optics of the forensic light source of the present invention.
Figure 2:
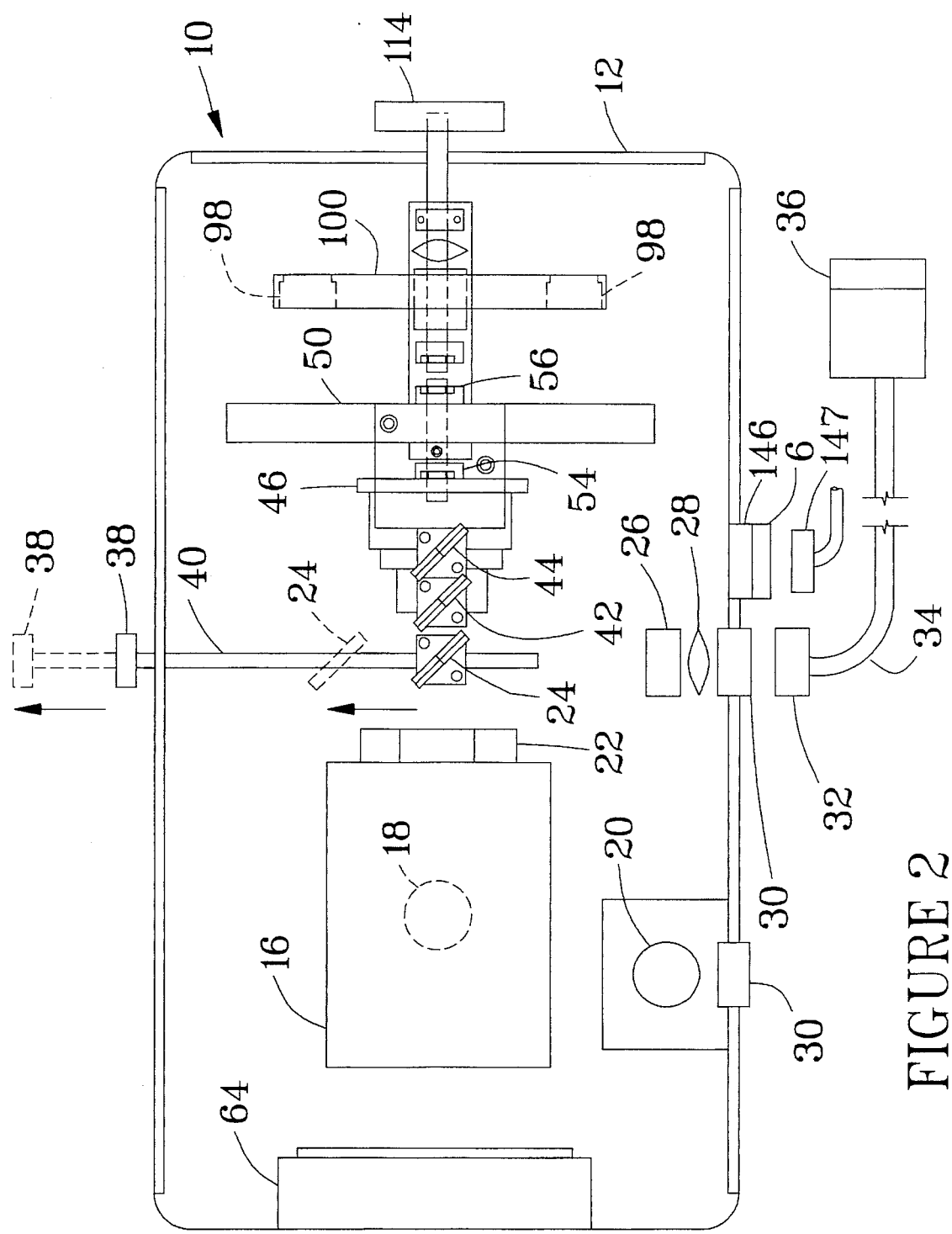
FIG. 2 is a top plan view of the optics of the inventive forensic light source along lines 2—2 of FIG. 1.

Referring to FIGS. 1 and 2, the structure of the inventive forensic light source 10 is seen to comprise a housing 12. Contained within housing 12 is a power supply 14 which powers a lamp contained in a lamp housing 16.

A lamp 18 is contained within lamp housing 16. Lamp 18 is a 300 watt xenon lamp which is particularly advantageous to provide light for outputs in the range of 280–1100 nanometers.

A separate 150 watt black light long wave ultraviolet source 20 can be used to provide light in a specific ultraviolet range, e.g. on the order of 365 nm. As shown, this ultraviolet source can be utilized via port 21.

Light output from housing 16 exits through a lens assembly 22. Light exiting lens assembly 22 is first caused to fall upon a slidably mounted ultraviolet reflecting filter 24. Ultraviolet reflecting filter 24 has the characteristic of reflecting light in the Ultraviolet range toward an ultraviolet bandpass filter 26 which in turn passes ultraviolet light on through a lens 28 to an output port 30 located on housing 12.

Port 30 is adapted to receive an optical coupler 32 on a liquid optical wave guide 34 which may typically be on the order of six feet long and provided at its end with means for mounting an ultraviolet filter 36.

Ultraviolet reflecting filter 24 is mounted on a track which allows it to be slid out of position to the position illustrated in dashed lines in FIG. 2 by pulling of a knob 38 resulting in the pulling of coupler rod 40 and filter 24 to the position illustrated in phantom lines in FIG. 2. Naturally, when filter 24 is in the position illustrated in phantom lines in FIG. 2, no ultraviolet light is passed through port 30 to coupler 32.

While ultraviolet reflecting filter 24 reflects ultraviolet light toward bandpass filter 26 and, ultimately port 30, filter 24 passes light which is not in the ultraviolet range toward filters 42 and 44 which may be selected for any design characteristics. For example, in accordance with the preferred embodiment, this would be the visible range.

In particular, in accordance with the preferred embodiment, filters 42 and 44 have the characteristic of reflecting infrared radiation off to the side, because they are mounted at a forty-five degree angle with respect to the path of light from the lamp. This allows the passage of only visible light toward an optional bandpass filter 46 as illustrated most clearly in FIG. 1.

The light output through bandpass lens 46 is then passed through one of any number of filters 48 located around the circumference of a rotatably mounted filter wheel 50. Filter wheel 50 is mounted on a rod 52 which is mounted on a pair of support arms 54 and 56.

Rod 52 is rotated to rotate filter wheel 50 and select any one of the filters by a motor 58. A support plate 61 secures motor 58 to arm 54, thus causing motor 58 to tilt in response to the rotation of wheel 50 in the direction indicated by arrow 66 about its vertical axis. Motor 58 is coupled by a transmission 60 to rod 52. Motor 58 is controlled by electronic control circuit 62 which is powered by power supply 64.

Filter wheel 50 may be rotated in the direction indicated by arrow 66 in FIG. 1. Arms 54 and 56 are mounted on a platform 68. Platform 68 is rigidly coupled to a rotatably mounted bar 70 between a pair of support plates 72 and 74 which are maintained in position by a pair of vertical support plates 76 and 78. A gear 80 is rigidly secured to bar 70 and coupled by a cross mounted gear 82, which is mounted on a rod 88 between plate 76 and another vertical support plate 84 which passes through a hole 86 in housing 12. Rod 88 is secured to gear 82 and mounted rotatably on plates 76 and 84. A knob 90 is attached to the end of rod 88. Rotation of knob 90 results in rotating gear 82, which in turn rotates gear 80 to rotate rod 70 and ultimately filter wheel 50 with filters 48 mounted therein. Rod 70 is rigidly coupled to platform 68 filter wheel 50 is tiltably rotated by 0 to 30 degrees. The purpose of rotating knob 90 is to rotate the position of filter wheel 50 and filters 48 for the purpose of varying the wavelength of light passing through filters 48 in accordance with Bragg's Law for which purpose filters 48 are preferably bandpass interference filters. This enables wavelength selection. In accordance with the preferred embodiment, fifteen filters 48 are provided on wheel 50. With a tilt in angle of zero to thirty degrees through the use of knob 90, a wavelength range suitable for most forensic work may be achieved with continuous coverage of all desired wavelengths from 390 to 670 nm.

In accordance with the preferred embodiment, an optical source 92 and detector 94 are provided to detect the position of a pin 96, in order to provide a calibration point from which rotation of filter wheel 50 may be performed by rotating wheel 50 at start up until pin 96 is detected. In accordance with the preferred embodiment, there is further provided means for delaying the turning on of the electronic control circuit 62 until after transients from the activation of the lamps in lamp housing 16 have passed.

Further filtering is provided by a second set of filters 98 on a second filter wheel 100. Finally, light output through filters 98 is passed through a lens 102 mounted in a lens support 104. From lens 102 light passes through to a fiber optic coupler 106 of length of about six feet. At the end of fiber optic coupler 106 is a filter holding output light port 108 which has a collimator has at its end. In addition, in principle, the same can be stacked to provide additional rejection in the desired range.

Coupler 108 on the liquid light guide for visible and ultraviolet light may also include a lens 110 which may be adjusted transversely along the coupler in the direction indicated by arrows 112 to provide the desired degree of focusing.

Filter wheel 100 may be rotated by rotating knob 114, which is rigidly coupled to rod 116, which in turn is rigidly coupled to filter wheel 100 to rotate filter wheel 100 and introduce any desired filter 98 into the path of output light.

Thus, it can be seen that light output from housing 16 passes through ultraviolet reflecting filter 24, infrared reflecting filters 42 and 44, lens 46, and then on to filter wheel 50 and then filter wheel 100 to the output of light conducting cable 106.

In accordance with the preferred embodiment, port 108 may be made larger than normal for easy gripping and provided with a pair of switches 118 and 120 for adjusting the wavelength passed by the system by rotating motor 58. If desired, motor 58 may be a stepper motor. The contacts from switches 118 and 120 are coupled to electronic control circuit 62 by a cable 122 which may, for example, be wound around optical wave guide 106 and either directly provided with electrical connection to control circuit 62 by appropriate contacting structure inside port 104 and the coupler portion 124 of fiber optical waveguide 106 or by a separate plug 126 which mates with a jack 128 associated with control circuit 62.

In accordance with the preferred embodiment of the invention, a particular filter arrangement may be employed. In particular, the following filters may be used. They have been specified on the basis of fifty percent cut on/cut off values by wavelength. For filter wheel 100 a 500 nm long pass filter, a 550 nm long pass filter, a 505 nm short pass filter, and a 560 nm short pass filter are used.

The following values may be used for filter wheel 50. The following filters have a bandpass of 35 to 70 nanometers centered about the following wavelengths: 415 nm, 430 nm, 445 nm, 455 nm, 475 nm, 495 nm, 515 nm, 535 nm, 555 nm, 575 nm, 600 nm, 635 nm and 670 nm. An open hole is also provided on wheel 50. These filters are disposed in the order noted above on the filter wheel with the exception that a filter referenced herein as a "CSS-type filter" having a broad bandpass between 400 and 520 nanometers is disposed between the 495 nm and 515 nm filters for broadband searching of the crime scene. In accordance with the preferred embodiment of the system, ultraviolet filter 24 has a band reflection characteristic of 280–380 nm and filters 42 and 44 have bandpass reflections of 630–1100 nm but the infrared output of the system can be changed to 715–1100 nm, or 780–1100 nm or 830–1100 nm by appropriate infrared long pass reflection filters.

In accordance with the preferred embodiment of the invention, two wheels are provided to interject two filters into the path. In addition, wheel 100 has two open slots which allow unfiltered light to pass. Generally, the purpose of the filters on wheel 50 is to provide a desired wavelength band which may be varied in accordance with rotation of the filter wheel and the respective filter 48 by rotation of knob 90.

The second wheel 100 gives the user the opportunity of varying the peak shape of the bandpass. In particular, the right or left edges of the peak can be modulated with the long pass and short pass filters to adjust the light purity. For example, typically the forensic light source will be used with orange or red filters on a camera or the eyes which are designed to eliminate the excitation frequency and transmit fluorescence from the organic or other deposition under examination, either for direct examination by the human eye or photography by a camera.

Figure 3:
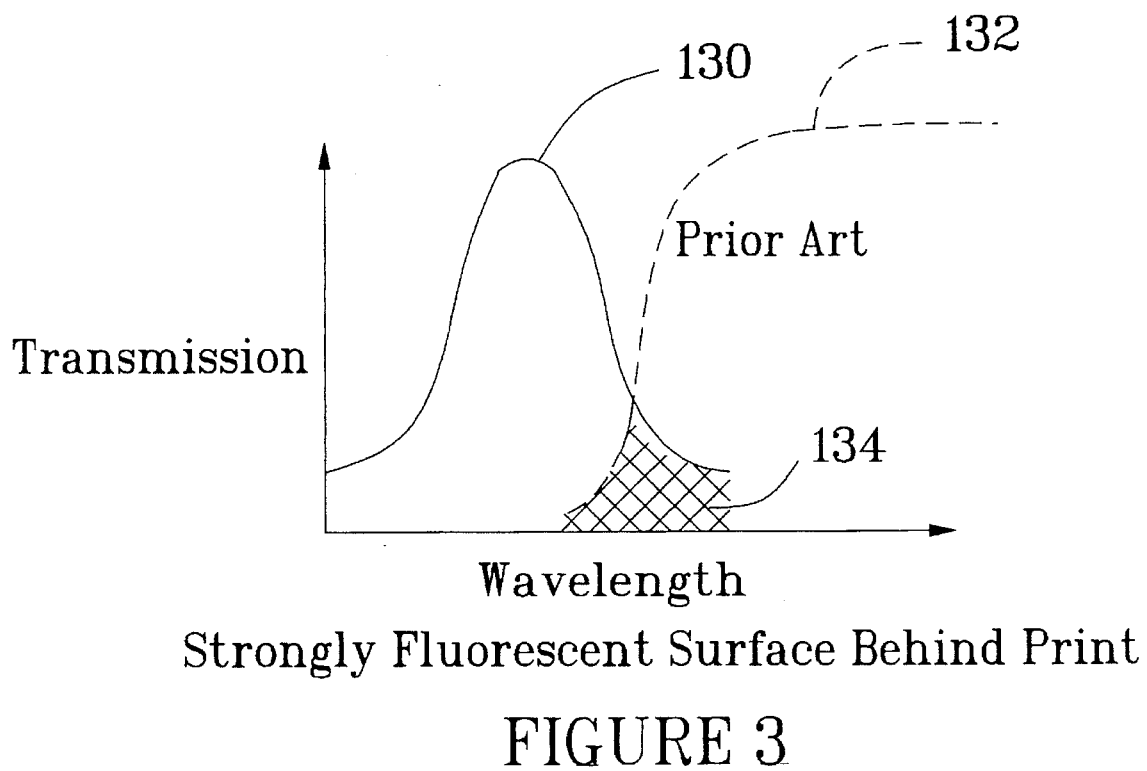
FIG. 3 is a diagram illustrating operation of prior art systems.

Referring to FIG. 3, the transmission characteristic 130 of one of the filters 48 in filter wheel 50 is illustrated. Goggles 133 (FIG. 1) or filters used in connection with use of the system have characteristic 132 which blocks the transmission wavelength, thus allowing the passage only of fluorescence from the organic or other deposition. However, a portion 134 of the energy in the light output by light filters 48 is not well blocked by the characteristic 132 of the goggles 133 or camera filter.

Figure 4:
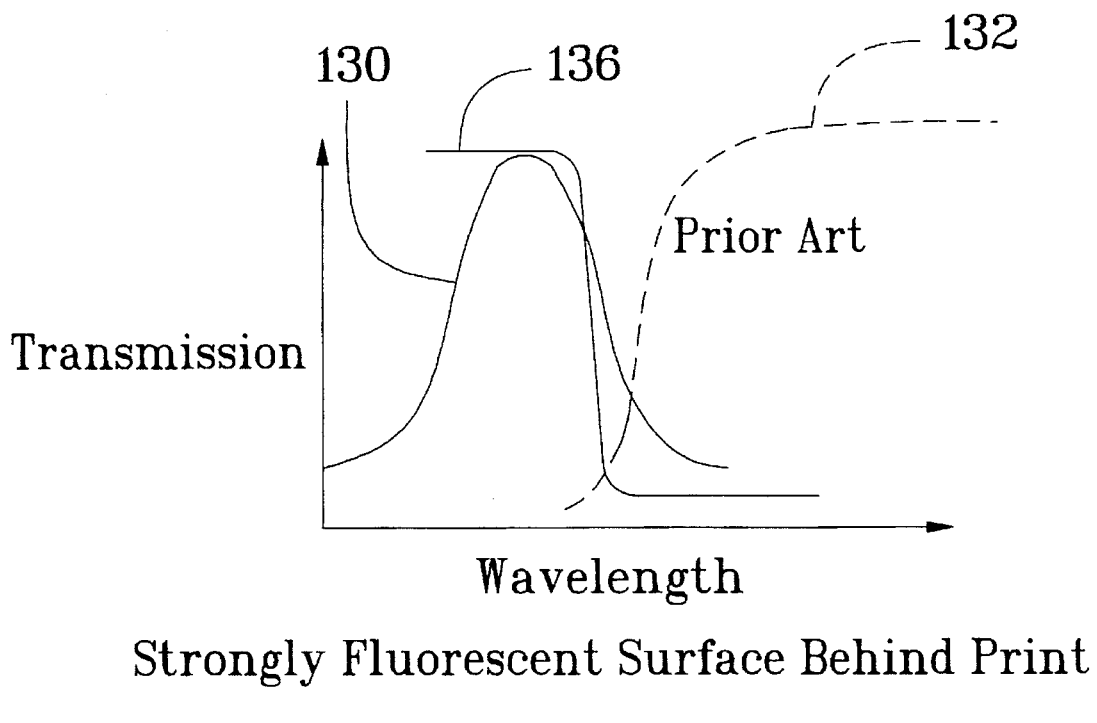
FIG. 4 illustrates an improvement over the prior art operation illustrated in FIG. 3.

Accordingly, some advantageous shaping of the same can be achieved, as illustrated in FIG. 4. More particularly, the transmission characteristic 130 of the filter remains unchanged and a low-pass filter on wheel 100 introduces its characteristic 136 resulting in blocking the unwanted energy 134. This has the effect of giving a sharper peak to the system and moving the bandpass peak closer to the wavelengths passed by the orange or red filters. At the same time, the advantage of higher blocking and greater light purity is also achieved by such an arrangement.

More particularly, where there is a strongly reflecting background, one uses one of the two short-pass filters on wheel 100. If, on the other hand, the background surface is strongly fluorescing, the two long-pass filters on wheel 100 will be used in combination with the broadband filters on wheel 50. In particular, it is noted that the 455 nanometer filter on wheel 50 is a broad-band filter. Likewise, the CSS filter is also a broad-band filter.

Figure 5:
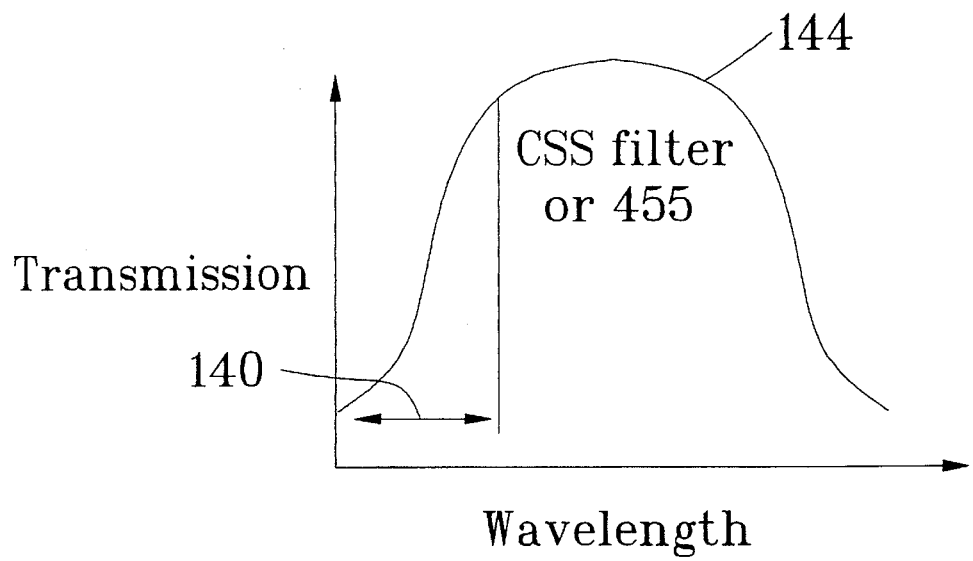
FIGS. 5 and 6 illustrate low wavelength bandpass shape.
Figure 6:
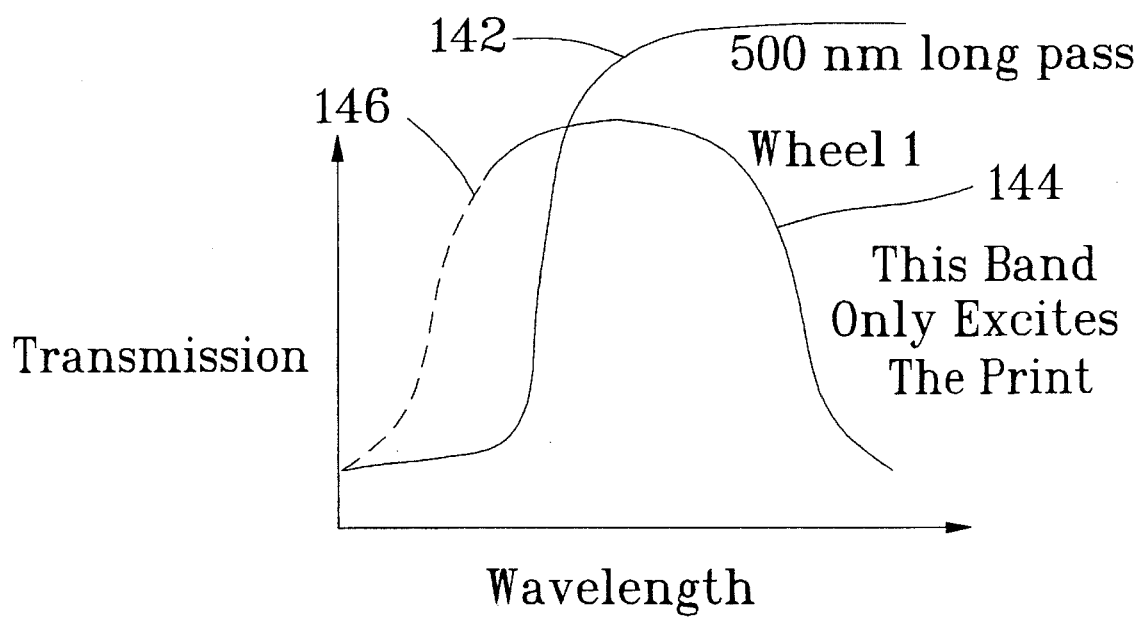

The long-pass filters on wheel 100 eliminate the low excitation wavelength and at the same time reduce or eliminate the background fluorescence. This is advantageous because the low wavelength range is typically that aspect of the excitation which excites the surface below the print. This arrangement is shown in FIGS. 5 and 6. In particular, FIG. 5 illustrates the use of the CSS filter. More particularly, as illustrated in FIG. 5, the wavelength range 140 is that low wavelength range which typically excites the surface underneath the print. It is desired to remove this wavelength range from the output and so the long pass filter with characteristic 142 is introduced, thus shaping the characteristic 144 of the CSS filter to substantially attenuate that portion 146 of its range shown in dashed lines in FIG. 6. A light guide 147 is provided for port 146. This light guide may receive any one of a number of different infrared long pass filters with cut-off wavelengths of 630 nanometers, 715 nm, 780 nm or 830 nm, and comprise a fiber optic bundle.

In accordance with the present invention, both wheel 50 and wheel 100 have open holes which allow the other wheel to be used individually. Use of wheel 50, alone, without any interaction by wheel 100 provides narrow bands for excitation in a conventional manner. Use of wheel number 100 alone provides, for example, long pass outputs for ink differentiation and absorption modes. It also allows the use of the short pass filters alone for broad excitation and the finding of weak finger print fluorescence at a crime scene. Similarly, filter 24 can be taken out of the pass of the system to provide relatively strong output at port 105. Alternatively, the system can be used with filter 24 in the path which can provide three simultaneous outputs, namely, visible light output through the front, infrared output through a port 146 which is also coupled to a flexible optical wave guide, and ultraviolet output to port 30.

As can be seen from the above, the bandpasses from the various filters on wheel 50 do not overlap. The bandpasses may, however, be extended to longer wavelengths by the rotation of knob 90 to the extent that substantial continuous uninterrupted wavelength tuning may be achieved. Moreover, the combination of up-down filter control switches 118 and 120 on the output of the fiber optic wave guide or, optionally, a liquid optic wave guide is particularly advantageous to use because a single hand may be used to adjust wavelength and direct light toward various forensic depositions, while the other hand holds the unit or attends to other functions.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. A forensic light source device of the type including a light source and output means for outputing light from a housing, said light source outputing light along a path from said source to said output means, wherein the improvement comprises:

(a) an ultraviolet reflecting mirror, for providing an ultraviolet light output, said mirror being movably mounted on a movable support to be selectively positioned at a first position in said path of said light output from said housing or at a second position external to said path; and (b) a rotatable wheel having a plurality of bandpass filters mounted thereon, said rotatable wheel being positioned in said path and spaced from said mirror.

2. A device, as in claim 1 wherein said mirror reflects light in the range roughly between 280 and 380 nanometers.

3. A device, as in claim 1, wherein said movable support comprises a slide.

4. A device, as in claim 1, wherein said light source comprises a high intensity broad spectrum lamp contained within said housing and said forensic device further comprises means to directly couple the output of said light source to a light waveguide and a separate ultraviolet light source.

5. A device as in claim 1, wherein, said first position of said mirror is located between said filter wheel and said light source.

6. A device according to claim 1 wherein said light source comprises a broad spectrum, high-intensity light source located in said housing, said light source providing a broad spectrum output beam of infrared, visible and ultraviolet wavelengths, said output means comprises an ultraviolet output ports, a visible light output port and an infrared output port for outputting the respective selected wavebands from said housing, and said forensic device further comprises:

c) an infrared reflecting mirror to reflect infrared light from an ultraviolet-attenuated beam transmitted by said ultraviolet-reflecting mirror, said infrared reflecting mirror transmitting shorter wavelengths, thereby outputting an infrared beam and transmitting a visible light beam;

d) a motorized drive to rotate said wheel of bandpass filters through said visible light beam;

e) a rotatably mounted support for said wheel of bandpass filters and for said motorized drive, said support being rotatable about an axis transverse to said visible light beam to incline a filter in said visible light beam for tuning; and f) an array of contrast filters selectively insertable in said bandpass-filtered visible light beam to modulate the contrast of the filtered visible light beam;

whereby, with said ultraviolet reflecting mirror positioned in said path of said light output, a user can simultaneously output up to three wavebands via said output ports, said wavebands being selected from ultraviolet, infrared and visible wavebands, and whereby a user can move said ultraviolet reflecting mirror to a position external to said light path, in which position a higher intensity visible output and an infrared output are available.

7. A forensic light source device of the type including a light source and means for outputting light from a housing, wherein the improvement comprises:

(a) a housing;

(b) a rotatable filter wheel positioned within said housing having a plurality of band pass filters mounted thereon, said filters being located on the circumference of said rotatable filter wheel;

(c) a rotatable support rotatably mounted in said housing, said wheel being mounted on said support for rotation independent of the rotation of said rotatable support;

(d) a motor for rotating said rotatable filter wheel to introduce different filters into the output light path, said motor being mounted on said support, whereby rotation of said support results in moving said motor and said rotatable filter wheel to an angle other than 90 degrees with respect to the angle of incidence of light from said light source.

8. A device, as in claim 7, further comprising a flexible waveguide with an input end, attached to said housing and coupled to receive light along said output light path and an output end, wherein said motor is responsive to an electrical switch associated with and proximate to the output end of said flexible wave guide, said waveguide being coupled to receive light passed through said filter wheel, whereby a user may hold the output end of said wave guide, aim the same at something to be examined and change the filter through which light is passed by using the same hand that is holding and aiming the output end of the light wave guide.

9. A device, as in claim 7, further comprising a second filter wheel assembly which may be rotated to introduce, into said output light path, a second filter of desired long pass or short pass characteristic to shape the bandpass of the filter in the first filter wheel or eliminate a desired range of light on the output of this system.

10. A device, as in claim 7, wherein said wheel rotates about an axis which substantially passes through a filter in said output light path.

11. A device, as in claim 7, wherein said light source comprises a high intensity visible spectrum lamp contained within said housing and means to directly couple its output to a light waveguide and said forensic device comprises a separate ultraviolet light source.

12. A device according to claim 7 wherein said light source comprises a broad spectrum, high-intensity light source located in said housing, said light source providing a broad spectrum output beam of infrared, visible and ultraviolet wavelengths, said output means comprises an ultraviolet output port, a visible light output port and an infrared output port for outputting the respective selected wavebands from said housing, and said forensic device further comprises:

c) an infrared reflecting mirror to reflect infrared light from an ultraviolet-attenuated beam transmitted by said ultraviolet-reflecting mirror, said infrared reflecting mirror transmitting shorter wavelengths, thereby outputting an infrared beam and transmitting a visible light beam;

d) a motorized drive to rotate said wheel of bandpass filters through said visible light beam;

e) a rotatably mounted support for said wheel of bandpass filters said support being rotatable about an axis transverse to said visible light beam to incline a filter in said visible light beam for tuning; and f) an array of contrast filters selectively insertable in said bandpass-filtered visible light beam to modulate the contrast of the filtered visible light beam;

whereby, with said ultraviolet reflecting mirror positioned in said path of said light output, a user can simultaneously output up to three wavebands via said output ports, said wavebands being selected from ultraviolet, infrared and visible wavebands, and whereby a user can move said ultraviolet reflecting mirror to a position external to said light path, in which position a higher intensity visible output and an infrared output are available.

13. A forensic light source device comprising a housing, a broad spectrum, high-intensity light source located in said housing, said light source providing a broad spectrum output beam of infrared, visible and ultraviolet wavelengths and a plurality of light output ports for selectively outputting ultraviolet, infrared and visible wavebands from said housing, said device comprising:

a) an ultraviolet reflecting mirror to reflect ultraviolet light from said broad spectrum output beam and transmit longer wavelengths thereby outputting an ultraviolet beam to said ultraviolet port and transmitting an ultraviolet-attenuated beam; and b) an infrared reflecting mirror to reflect infrared light from said ultraviolet-attenuated beam and transmit shorter wavelengths, thereby outputting an infrared beam to said infrared port and transmitting a visible light beam to said visible light port.

14. A device according to claim 13 comprising c) a movable support for said ultraviolet reflecting mirror to move said mirror into and out of the path of said broad-spectrum output beam;

whereby, with said ultraviolet reflecting mirror positioned in the path of said broad-spectrum output beam, a user can simultaneously output up to three wavebands via said output ports, said wavebands being selected from ultraviolet, infrared and visible wavebands, and whereby a user can move said ultraviolet reflecting mirror out of said path, in which position a higher intensity visible output and an infrared output are available.

15. A device according to claim 13 comprising:

d) an array of bandpass interference filters selectively insertable in said visible light beam.

16. A device according to claim 15 comprising:

e) a motorized drive to advance said bandpass filter array through said visible light beam; and f) a rotatably mounted support for said array of filters and motorized drive, said support being rotatable about an axis transverse to said visible light beam to incline a filter in said visible light beam for tuning.

17. A device according to claim 15 comprising:

an array of contrast filters selectively insertable in said bandpass-filtered visible light beam.

18. A device according to claim 15 comprising:

e) a motorized drive to advance said bandpass filter array through said visible light beam; and g) a filter array sensor and marker for calibration, said motor being controlled by the output from said sensor.

19. A device according to claim 15 comprising:

e) a motorized drive to advance said bandpass filter array through said visible light beam said motorized drive including a stepper motor advancing said array of filters incrementally, one filter at a time.

20. A device according to claim 13 comprising an ultraviolet bandpass filter to filter said ultraviolet output.

21. A device according to claim 13 in combination with light-filtering viewing means for use in forensically examining samples with light from said device.

22. A device according to claim 13 in combination with a separate ultraviolet light source.

23. A forensic light source device comprising a housing, a broad spectrum, high-intensity light source located in said housing, said light source providing a broad spectrum output beam of infrared, visible and ultraviolet wavelengths and a plurality of light output ports for selectively outputting ultraviolet, infrared and visible wavebands from said housing, said device comprising:

a) an ultraviolet reflecting mirror to reflect ultraviolet light from said broad spectrum output beam and transmit longer wavelengths thereby outputting an ultraviolet beam to said ultraviolet port and transmitting an ultraviolet-attenuated beam;

b) an array of bandpass interference filters selectively insertable in said visible light beam; and c) an array of contrast filters selectively insertable in said bandpass-filtered visible light beam.

* * * * *